United States Patent Office 2,772,627
Patented Dec. 4, 1956

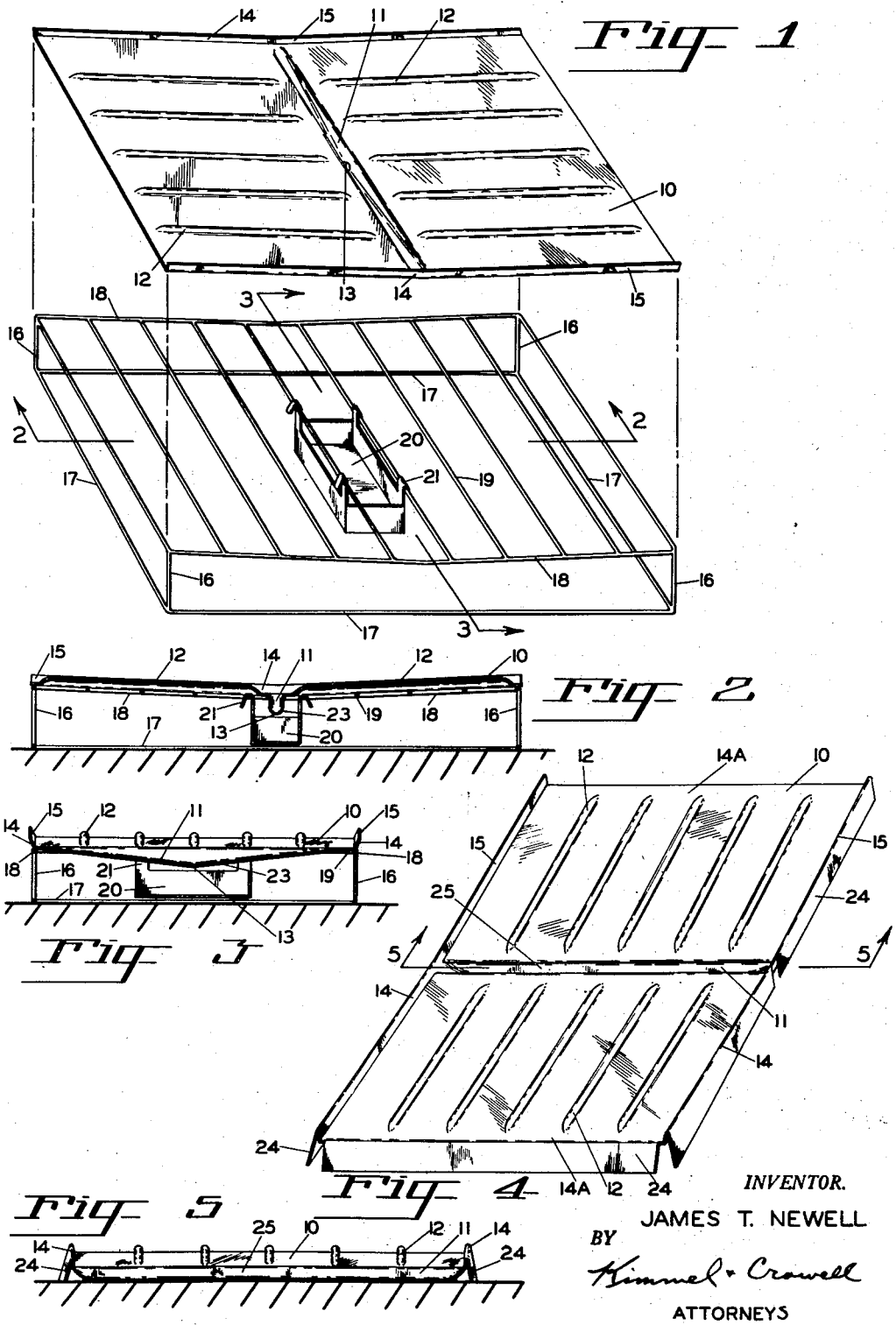

2,772,627

DISPOSABLE BROILER PANS

James T. Newell, Eugene, Oreg.

Application November 5, 1954, Serial No. 466,960

2 Claims. (Cl. 99—425)

This invention relates to disposable broiler pans and is particularly adapted for the cooking of meat, fish and the like within ovens.

The primary object of this invention is to provide a disposable broiler pan that can be thrown away after the food has been broiled or cooked thereon.

A further object of this invention is to provide a disposable broiler pan, having ribs over its surface for supporting the materials being broiled away from the actual surface of the pan.

Another object is the provision of a drain trough for receiving the juices exuded from the object being cooked.

A still further object of the invention is to provide a disposable container for receiving these juices from the broiling pan.

Another object of the invention is to provide a grill support for the broiler pan.

And a still further object of the invention is to provide a disposable grill that is self-contained, having its own means of support.

Other and further objects and advantages of this invention will become more apparent from a consideration of the following specification when read in conjunction with the annexed drawing, in which:

Figure 1 is an exploded perspective view of my new and improved disposable broiler pan and supporting grill.

Figure 2 is a sectional view, taken on line 2—2 of Figure 1, showing the broiler pan resting upon the grill.

Figure 3 is an end sectional view, taken on line 3—3 of Figure 1, illustrating the broiler pan in section.

Figure 4 is a perspective view of a broiler pan, which in itself is self-contained, requiring no grill for support.

Figure 5 is a sectional view, taken on line 5—5 of Figure 4, illustrating a section through the drain trough which in itself provides a support for the relatively thin material from which the broiler pan is pressed from.

Referring more specifically to the drawing, my invention consists of a relatively thin and disposable sheet of material 10, having a drain trough 11 running transversely thereof in one direction. Formed on either side of this drain trough are ribs 12 upon which the object being broiled rests upon separating the same from the general area of the sheet 10, permitting the juices to drain into the trough 11.

It will be noted that the sheet of material 10 slopes on either side towards the drain trough. The drain trough also slopes to the opening 13, referring to Figure 3, from each edge 14 of the material 10. The edge 14 may or may not be turned up as at 15, the said bend 15 assists in supporting the sheet 10, together with the ribs 12, giving the pan strength, as well as preventing juices running over the edges of the sheet at either end of the trough 11.

In the event the disposable broiler pan is to be used in connection with a supporting rack, the same is used as in Figures 1, 2 and 3. The rack consists of vertical members 16 connected together by the rods 17 forming a base. Rods 18 are mounted on the top of the supports 16 and are adapted to support the transverse grill rods 19 upon which the broiling pan 10 is adapted to rest when used in connection with the said grill.

A disposable juice receiving pan 20 is adapted to be supported under the sheet 10 by the hangers 21. An opening 13 is formed in the bottom 23 of the drain trough 11, adapted to discharge the juices into a drip pan 20, referring particularly to Figure 3.

Referring now to Figures 4 and 5, the broiling grill consisting of the sheet 10 is adapted to support its own weight, including the object being broiled. The edges 14 and 14A of the pan are turned down at approximately right angles at 24. These turned down edges are adapted to support the sheet 10.

The trough 25 is relatively deep and is adapted to receive and hold the juices draining into the said trough from the object being cooked. This drain trough supports the transverse weight of the pan, together with the object being cooked midway the pan in one direction where the ribs 12 support the said pan between the down turned edges 24 and the trough so that a relatively light material can be used in the manufacturing of the broiling pan, referring particularly to Figure 4, this material being of a disposable nature.

In the operation of this new disposable broiling pan, the pan may be mounted upon a grill, or it may be self-contained. When the object to be broiled or cooked rests upon the re-enforcing ribs 12, which help to support the pan, the same then allows the juices to drain under the object being cooked into the drain troughs 11 or 25. After the cooking has been completed the entire pan can be collapsed and disposed of.

Having described and illustrated one embodiment of this invention in detail, it will be understood that the same is offered merely by way of example, and that the invention is to be limited only by the scope of the appended claims.

What is claimed is:

1. In combination, a grill for supporting a broiler pan sheet, said grill comprising a pair of spaced substantially parallel side supporting members, a plurality of spaced supporting members extending transversely of said side members and having their opposed ends secured thereto, means for supporting said longitudinally extending and transversely extending supporting members in elevated position, said longitudinally extending members being bent into a substantially V-shaped configuration and having at least one of said transverse supporting members disposed on opposite sides of the apex thereof, a receptacle detachably secured to said last-named transversely extending supporting members and depending below all of said supporting members, a disposable broiler pan supported on said supporting members and comprising an elongated sheet of material having a substantially V-shaped longitudinal cross-sectional configuration conforming to and complementing the V-shaped configuration of said grill, said sheet having a trough formed therein and projecting laterally from a side thereof at the apex of said sheet, said trough having a drainage aperture formed therein and disposed within said receptacle, a plurality of spaced parallel ribs formed in said sheet and projecting away from the other side of said sheet, and each longitudinally extending edge of said sheet having a flange projecting away from said other side of said sheet.

2. In combination, a grill for supporting a broiler pan sheet, said grill comprising a pair of spaced substantially parallel side supporting members, a plurality of spaced supporting members extending transversely of said side members and having their opposed ends secured thereto, means for supporting said longitudinally extending and transversely extending supporting members in elevated position, said longitudinally extending members being bent into a substantially V-shaped configuration and having at least one of said transverse supporting members disposed on opposite sides of the apex thereof, a receptacle detachably secured to said last-named transversely extending supporting members and depending below all of said supporting members, a disposable broiler pan comprising an elongated sheet of material having a substantially V-shaped longitudinal cross-sectional configuration, said sheet having a trough formed therein and projecting laterally from a side thereof at the apex of said sheet, said trough having a drainage aperture formed therein, a plurality of spaced parallel ribs formed in said sheet and projecting away from the other side of said sheet, and each longitudinally extending edge of said sheet having a flange projecting away from said other side of said sheet, said flanges terminating in reverted ends coplanar with the bottom of said trough and the ends of said sheet being provided with depending flanges which have their respective free ends coplanar with said bottom of said trough.

References Cited in the file of this patent

UNITED STATES PATENTS

| | | |
|---|---|---|
| 453,418 | Stroud | June 2, 1891 |
| 1,222,390 | Gorham et al. | Apr. 10, 1917 |
| 1,542,867 | Fisher | June 23, 1925 |
| 1,783,183 | Dibble | Dec. 2, 1930 |
| 1,962,908 | Pierson | June 12, 1934 |
| 2,682,831 | Pellegrin | July 6, 1954 |